US008473749B1

(12) United States Patent
Madsen et al.

(10) Patent No.: US 8,473,749 B1
(45) Date of Patent: Jun. 25, 2013

(54) METHODS AND APPARATUS FOR PREPROVISIONING AUTHENTICATION TOKENS TO MOBILE APPLICATIONS

(75) Inventors: Paul Madsen, Ottawa (CA); Brian Campbell, Denver, CO (US)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 13/544,553

(22) Filed: Jul. 9, 2012

(51) Int. Cl.
*H04L 29/06* (2006.01)
(52) U.S. Cl.
USPC ........... 713/187; 713/188; 713/189; 713/194; 726/26; 726/27; 726/28
(58) Field of Classification Search
USPC ........................................................ 713/187
See application file for complete search history.

(56) References Cited

U.S. PATENT DOCUMENTS

| 7,500,262 | B1 * | 3/2009 | Sanin et al. ........................ 726/2 |
| 2005/0240763 | A9 | 10/2005 | Bhat et al. |
| 2009/0113527 | A1 | 4/2009 | Naaman et al. |
| 2011/0265173 | A1 | 10/2011 | Naaman et al. |
| 2012/0117626 | A1 * | 5/2012 | Yates et al. ........................ 726/4 |
| 2012/0144202 | A1 | 6/2012 | Counterman |

OTHER PUBLICATIONS

"Migrating tokens to system accounts," Twitter Developers, Nov. 7, 2011, Retrieved from the Internet: <URL: http://www.dev.twitter.com/docs/ios/migrating-tokens-core-accounts/> (3 pages).
"API requests with TWRequest" Twitter Developers, Jan. 5, 2012, Retrieved from the Internet: <URL: http://www.dev.twitter.com/docs/ios/rnaking-api-requests-twrequest> (3 page).
Ryan Whitwam, "How Android Smartly Manages Your Accounts and Logins," Tested News, Jun. 8, 2011, Retrieved from the Internet: <URL: http://www..tested.com/news/feature/2437-how-android-smartly-manages-your-accounts-and-logins/> (4 pages).
"iOS Twitter framework," Twitter Developers, Dec. 5, 2011, Retrieved from the Internet: <URL: http://dev.twitter.com/docs/ios> (3 pages).
"AccountManager," Android Developers, Retrieved from the Internet: <URL: http://developer.android.com/reference/android/accounts/AccountManager.html> , Jan. 18, 2012 (11 pages).
"PackageManager," Android Developers, Retrieved from the Internet: <URL: http://developer.android.com/reference/android/content/pm/PackageManager.html>, Jul. 9, 2012 (41 pages).
"Authenticating to OAuth2 Services", Android Developers, Retrieved from the internet: http://developer.android.com/training/id-auth/authenticate.html, Jan. 2, 2013.

(Continued)

*Primary Examiner* — Longbit Chai
(74) *Attorney, Agent, or Firm* — Cooley LLP

(57) ABSTRACT

In some embodiments, a non-transitory processor-readable medium includes code to cause a processor (e.g., on an enterprise server) to receive, from a communication device, a request for a client application, and in response to the request provision the installation file data associated with the client application to include an application token associated with the client application. The code is to cause the processor to send the installation file that includes the application token to the communication device such that the communication device uses the installation file to install the client application that authenticates to an application module using the application token extracted from the installation file.

21 Claims, 4 Drawing Sheets

OTHER PUBLICATIONS

"Google Play Services", Android Developers, Retrieved from the Internet: https://developer.android.com/google/play-services/index.html, Jan. 2, 2013.

"Partner Programs Allow Mobile Application Developers to Easily Integrate with Active Directory Authentication and Deliver 'Zero Sign-On' to Enterprise Users", Oct. 18, 2012.

G. Fletcher, et al. "Oauth Use Cases draft-ietf-oauth-use-cases-00", May 23, 2012, pp. 1-23.

U.S. Office Action dated Oct. 2, 2012, mailed in U.S. Appl. No. 13/544,565.

* cited by examiner

300

```
┌─────────────────────────────────────────────────┐
│ Receive, from a communication device, a request │
│               for a client application.         │
│                       302                        │
└─────────────────────────────────────────────────┘
                          │
                          ▼
┌─────────────────────────────────────────────────┐
│ Send, to a token module, a request for an       │
│  application token associated with the client   │
│                   application.                   │
│                       304                        │
└─────────────────────────────────────────────────┘
                          │
                          ▼
┌─────────────────────────────────────────────────┐
│ Receive the application token in response to    │
│       the request for the application token.    │
│                       306                        │
└─────────────────────────────────────────────────┘
                          │
                          ▼
┌─────────────────────────────────────────────────┐
│ Provision the installation file data associated │
│  with the client application to include the     │
│                 application token.               │
│                       308                        │
└─────────────────────────────────────────────────┘
                          │
                          ▼
┌─────────────────────────────────────────────────┐
│ Send the installation file to the communication │
│ device such that the communication device can   │
│ install, using the installation file, the client│
│ application that authenticates to an application│
│ module using the application token extracted    │
│          from the installation file.             │
│                       310                        │
└─────────────────────────────────────────────────┘
```

```
Send, to an application distribution module, a request for a
client application.
402
```

```
Receive, from the application distribution module and in
response to the request for the client application, an installation
file associated with the client application that includes an
application token associated with the client application.
404
```

```
Install, at a communication device, the client application using
the installation file.
406
```

```
Extract the application token from the installation file such that
the client application is configured to be authenticated at an
application module remote from the communication device
using the application token.
408
```

FIG. 4

METHODS AND APPARATUS FOR PREPROVISIONING AUTHENTICATION TOKENS TO MOBILE APPLICATIONS

CROSS-REFERENCE TO RELATED APPLICATIONS

This application is related to co-pending U.S. patent application Ser. No. 13/544,565, filed Jul. 9, 2012, and entitled "Methods And Apparatus For Delegated Authentication Token Retrieval," which is incorporated herein by reference in its entirety.

BACKGROUND

Some embodiments described herein relate generally to using an application distribution module to provision an application token in an installation file associated with a client application. This allows the client application to be downloaded and installed on a communication device without the need of further authorization requests to other devices. Some of the embodiments described herein also relate to the methods and apparatus used for requesting the application tokens and provisioning the application tokens in the installation file associated with each client application.

Open Authorization (OAuth) is an open standard protocol for authorization, and allows a user (such as an enterprise employee) to grant a third-party application access to information associated with that user stored at a given location (e.g., on given website), without sharing that user's account credentials (e.g., password) or the full extent of that user's data. Some known systems use OAuth tokens to authenticate applications for users of a variety of devices (e.g., a laptop computer, a personal digital assistant (PDA), a standard mobile telephone, a tablet personal computer (PC), etc.). In such known systems, however, each application requests tokens individually from an appropriate OAuth authorization server. This typically involves significant use of available bandwidth and processor time, and generally leads to a usability burden for the user. Additionally, the enterprise for which the employee works is not directly involved in the issuance of application tokens to the applications and hence is removed from a desired level of policy control over the users' access to applications.

Accordingly, a need exists for methods and apparatus for authenticating multiple applications installed on a communication device without each application having to request tokens individually from an appropriate OAuth authorization server. Additionally or alternatively, a need exists for methods and apparatus to increase the involvement of the enterprise in having control of over the user's access to applications.

SUMMARY

In some embodiments, a non-transitory processor-readable medium includes code to cause a processor (e.g., on an enterprise server) to receive, from a communication device, a request for a client application, and in response to the request provision the installation file data associated with the client application to include an application token associated with the client application. The code is to cause the processor to send the installation file that includes the application token to the communication device such that the communication device uses the installation file to install the client application that authenticates to an application module using the application token extracted from the installation file.

BRIEF DESCRIPTION OF THE DRAWINGS

FIG. 3 is a flow chart illustrating a method of provisioning the installation file data associated with a client application on a communication device to include the application token, according to an embodiment.

FIG. 4 is a flow chart illustrating a method of receiving an individual installation file for a client applications approved for a user of a communication device, according to an embodiment.

DETAILED DESCRIPTION

Figure 1:
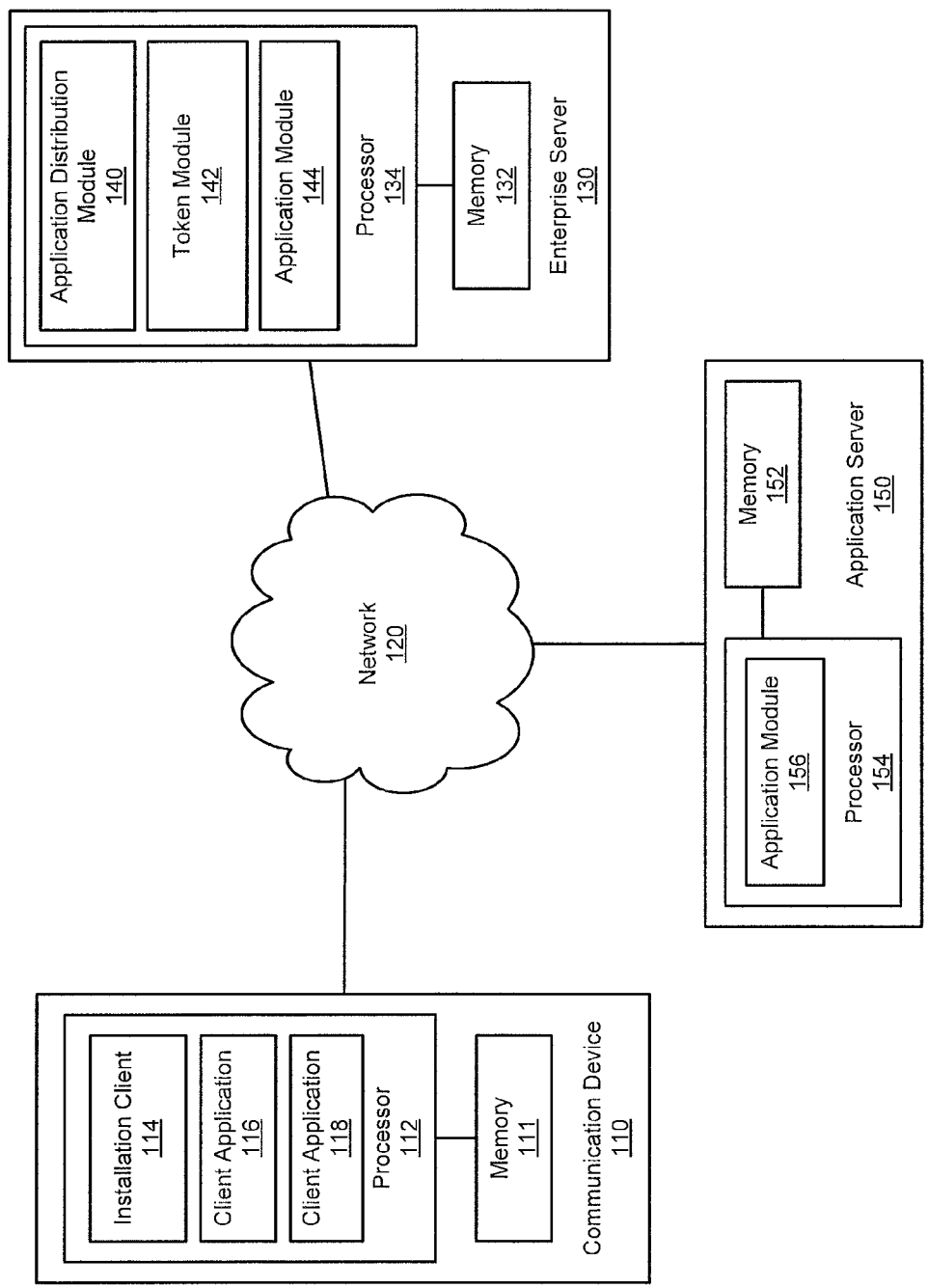
FIG. 1 is a schematic illustration of a system for provisioning application tokens in the installation file of client applications, and includes a communication device connected to an enterprise server and an application server via a network, according to an embodiment.

In some embodiments, a non-transitory processor-readable medium includes code to cause a processor (e.g., on an enterprise server) to receive, from a communication device, a request for a client application, and in response to the request provision the installation file data associated with the client application to include an application token associated with the client application. The code is to cause the processor to send the installation file that includes the application token to the communication device such that the communication device uses the installation file to install the client application that authenticates to an application module using the application token extracted from the installation file.

In such embodiments, the communication device can be, for example, a personal computing device such as a desktop computer, a laptop computer, a personal digital assistant (PDA), a standard mobile telephone, a tablet personal computer (PC), and/or the like. The communication device can include a memory and a processor. The client applications installed on the communication device can be, for example, accounting applications, sales force applications, payroll applications and/or the like. In other embodiments, the client applications can be any other enterprise or third-party applications configured to execute at the communication device. In some embodiments, the application distribution module can be a hardware and/or software module stored in the memory and executed in the processor of the enterprise server.

In some embodiments, the enterprise server can be, for example, a web server, an application server, a proxy server, a telnet server, a file transfer protocol (FTP) server, a mail server, a list server, a collaboration server and/or the like. The enterprise server can include a memory and a processor. The memory of the enterprise server can contain data associated with an application distribution module, a token module and an application module.

The application distribution module at the enterprise server can be configured to receive, from an installation client at a communication device, requests for one or many client applications via a network. The network can be any type of network such as a local area network (LAN), a wide area network (WAN), a virtual network, a telecommunications network, implemented as a wired network and/or wireless network. In response to the request, the application distribution module can be configured to send to a token module a request for an application token associated with the client application. In some embodiments, the token module can be a hardware and/or software module stored in the memory and executed in the processor of the enterprise server. In response to the request for an application token, the application distribution module can be configured to receive an application token from the token module. In some embodiments, the application distribution module can also be configured to provision the installation file data associated with the client application to include the application token (installation file). In such embodiments, the application distribution module can be configured to send the installation file (that includes the application token) to the communication device such that the communication device can install the client application using the installation file. In some embodiments, the client application can authenticate to an application module remote from the communication device using the application token extracted from the installation file.

In such embodiments, the installation client can be a hardware and/or software module stored in the memory and/or executed in the processor of the communication device. The installation client can be configured to send one (or multiple) request(s) for one (or multiple) client application(s) to the application distribution module on an enterprise server via a network. In response to each client application request, the installation client can be configured to receive from the application distribution module, an installation file provisioned with the associated application token for the authorized client application for the user of the communication device. The installation client can be configured to install at the communication device the client application using the installation file. The installation client can also be configured to extract the application token from the installation file such that the client application can be configured to be authenticated at an application module remote from the communication device using the application token.

As used in this specification, the singular forms "a," "an" and "the" include plural referents unless the context clearly dictates otherwise. Thus, for example, the term "a module" is intended to mean a single module or a combination of modules.

FIG. 1 is a schematic illustration of a system for provisioning application tokens in the installation file of client applications and includes a communication device connected to an enterprise server and an application server via a network, according to an embodiment. The application-token-provisioning-based application authorization system 100 includes a communication device 110, a network 120, an enterprise server 130 and an application server 150. The network 120 can be any type of network (e.g., a local area network (LAN), a wide area network (WAN), a virtual network, and a telecommunications network) implemented as a wired network and/or wireless network. As described in further detail herein, in some embodiments, for example, the communication device 110 can be connected to the enterprise server 130 and the application server 150 via an intranet, an Internet Service Provider (ISP) and the Internet, a cellular network (e.g., network 120), and/or the like.

The communication device 110 can be a personal computing device such as a desktop computer, a laptop computer, a personal digital assistant (PDA), a standard mobile telephone, a tablet personal computer (PC), and/or so forth. The communication device 110 includes a memory 111 and a processor 112. In some embodiments, the communication device 110 is configured to request and receive client applications from the enterprise server 130 and can access application modules (144 and/or 156) at the enterprise server 130 and/or application server 150 via the network 120 as described in further detail herein.

The memory 111 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 111 stores instructions to cause the processor 112 to execute modules, processes and/or functions associated with such an application-token-provisioning-based application authorization system 100.

The processor 112 can be a general purpose processor, a Field Programmable Gate Array (FPGA), an Application Specific Integrated Circuit (ASIC), a Digital Signal Processor (DSP), and/or the like. The processor 112 can be configured to run and/or execute user and/or application-authorization processes and/or other modules, processes and/or functions associated with an application-token-provisioning-based application authorization system 100. The processor 112 includes an installation client 114, a client application 116 and a client application 118.

The installation client 114 can be a native application installed on the communication device 110. The installation client 114 can be hardware module(s) and/or software module(s) (stored in memory 111 and/or executed in a processor 112) that sends user authentication information, requests a list of approved client applications for the user, and requests individual client applications 116 and 118, from the application distribution module 140. In some embodiments, the installation client 114 can include a web browser configured to present a set of applications (e.g., an app store such as an Android app store, an Apple app store, etc.) that the user can install on the communication device 110. In such embodiments, the user can select applications (e.g., via a link) from the set of applications. Based on the selection, the installation client 114 can receive an installation file (e.g., an Android application package file (APK)) used to install the application, as described in further detail herein.

In some embodiments, the installation client 114 can be configured to receive user authentication information, a list of approved client applications for the user, and/or individual installation files associated with client applications 116 and 118, as described in further detail herein. In some embodiments, the installation file data associated with the client applications 116 and 118 can be stored in a portion of the memory 132 associated with the application distribution module 140 on the enterprise server 130, and can be provisioned with an application token and downloaded onto the installation client 114. In other embodiments, the installation file data associated with the client applications 116 or 118 can be stored on a device separate from the enterprise server 130, and operatively coupled to the enterprise server 130 via the network 120. In such embodiments, upon receiving a request for a client application 116 or 118 from the installation client 114, the application distribution module 140 can authorize the installation file data associated with the client application 116 or 118 to be transferred to the application distribution module 140 from the location of storage via the network 120, before being provisioned with an application token and downloaded onto the installation client 114.

The client applications 116 and 118 can be hardware modules and/or software modules (stored in memory 111 and/or executed in a processor 112) configured to receive an application token from the installation file associated with the client application 116 or 118. The client applications 116 and 118 can be configured to be authenticated at an application module 144 or 156 remote from the communication device 110 using the application token. The client applications 116 and 118 can be configured to cause the processor 112 to execute specific operations. For example, client applications 116 and 118 can be associated with particular functions in an enterprise. For example, the applications 116 and 118 can be accounting applications, sales force applications, payroll applications and/or the like. In other embodiments, client applications 116 and 118 can be any other enterprise or third-party applications configured to be run and/or executed at the communication device 110.

The enterprise server 130 can be, for example, a web server, an application server, a proxy server, a telnet server, a file transfer protocol (FTP) server, a mail server, a list server, a collaboration server and/or the like. In some embodiments, the enterprise server 130 is configured to receive user authentication and/or client application requests from the communication device 110 and generate user authentication data, application tokens, and installation files associated with client applications in response to such requests. In some embodiments, the enterprise server 130 can also execute modules, processes and/or functions associated with such an application-token-provisioning-based application authorization system 100.

The enterprise server 130 includes a memory 132 and a processor 134. The memory 132 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 132 stores instructions to cause the processor 134 to execute modules, processes and/or functions associated with such an application-token-provisioning-based application authorization system 100.

The processor 134 can be a general purpose processor, a Field Programmable Gate Array (FPGA), an Application Specific Integrated Circuit (ASIC), a Digital Signal Processor (DSP), and/or the like. In some embodiments, processor 134 can be configured to run and/or execute application modules, processes and/or functions associated with such an application-token-provisioning-based application authorization system 100. For example, processor 134 can be configured to run and/or execute modules, processes, and/or functions associated with or in response to user authentication and client application requests. The processor 134 includes an application distribution module 140, a token module 142, and an application module 144.

The application distribution module 140 can be a hardware module and/or software module (stored in memory 132 and/or executed in a processor 134) that: (i) receives user authentication information and/or; (ii) requests for client applications and/or for a list of approved client applications, for individual users from the communication device 110 via the network 120. In some embodiments, the application distribution module 140 can be configured to generate and/or define installation files for client applications 116 and 118 on the communication device 110. The application distribution module 140 can also be configured to generate and/or define user authentication data for users associated with the communication device 110. In some embodiments, the application distribution module 140 can also send user authentication signals (e.g. an authentication acknowledgement and/or confirmation signal, an encrypted or unencrypted form of a user identity number that has been assigned to an approved user, an identifier of a user security/access level, etc.), and/or installation files provisioned with the application token to the installation client 114, as described in further detail herein.

The token module 142 can be a hardware and/or software module (stored in memory 132 and/or executed in a processor 134) that receives requests for application tokens from the application distribution module 140. In response to such requests, the token module 142 can be configured to generate and/or define a unique application token for a unique user of each client application and send the application token to the application distribution module 140 via the processor bus. For example, the token module 142 can be configured to generate a different application token for each user of the same client application. Similarly, the token module 142 can be configured to generate a different application token for each client application used by a single user.

The application module 144 can be a hardware module and/or a software module (stored in memory 132 and/or executed in a processor 134) configured to provide application data to client applications 116 and/or 118 via the network 120. For example, in instances where client application 116 is a payroll application, the application data provided by the application module 144 can include data on employee salary, hours worked, taxes and other withholdings, method of payment and/or the like. In some embodiments, such application data can enable client applications 116 and/or 118 to execute modules, processes and/or functions associated with the application-token-provisioning-based application authorization system 100. In some embodiments and as described in further detail herein, the application module 144 can receive and validate an application token from the communication device 110 prior to providing application data to the client applications 116 and/or 118.

The application server 150 can be a third party server distinct from the entity (e.g., company) with which the enterprise server 130 is associated. The application server 150 can be a Software as a Service (SaaS) host that can be, for example, a web server, a proxy server, a telnet server, a file transfer protocol (FTP) server, a mail server, a list server, a collaboration server, and/or the like.

The application server 150 includes a memory 152 and a processor 154. The memory 152 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory 152 stores instructions to cause the processor 154 to execute modules, processes and/or functions associated with application server 150 within the application-token-provisioning-based application authorization system 100.

The application module 156 can be a hardware module and/or a software module (stored in memory 152 and/or executed in a processor 154) configured to provide application data to client applications 116 and 118 via the network 120. For example, the application data can include results of external market analysis for a product of the enterprise and/or the like. This application data can be used by the client applications 114 and/or 116, for example, to set the retail price of the product, and/or to calculate the expected profit levels for the product, and/or to determine locations for the best retail vendors available for the product, and/or the like. In some embodiments, the application module 156 can receive and validate an application token from the communication device 110 prior to sending the application data to the client applications 116 and/or 118. Such application data can enable client applications 116 and 118 to execute modules, processes and/or functions associated with the application-token-provisioning-based application authorization system 100.

Figure 2:
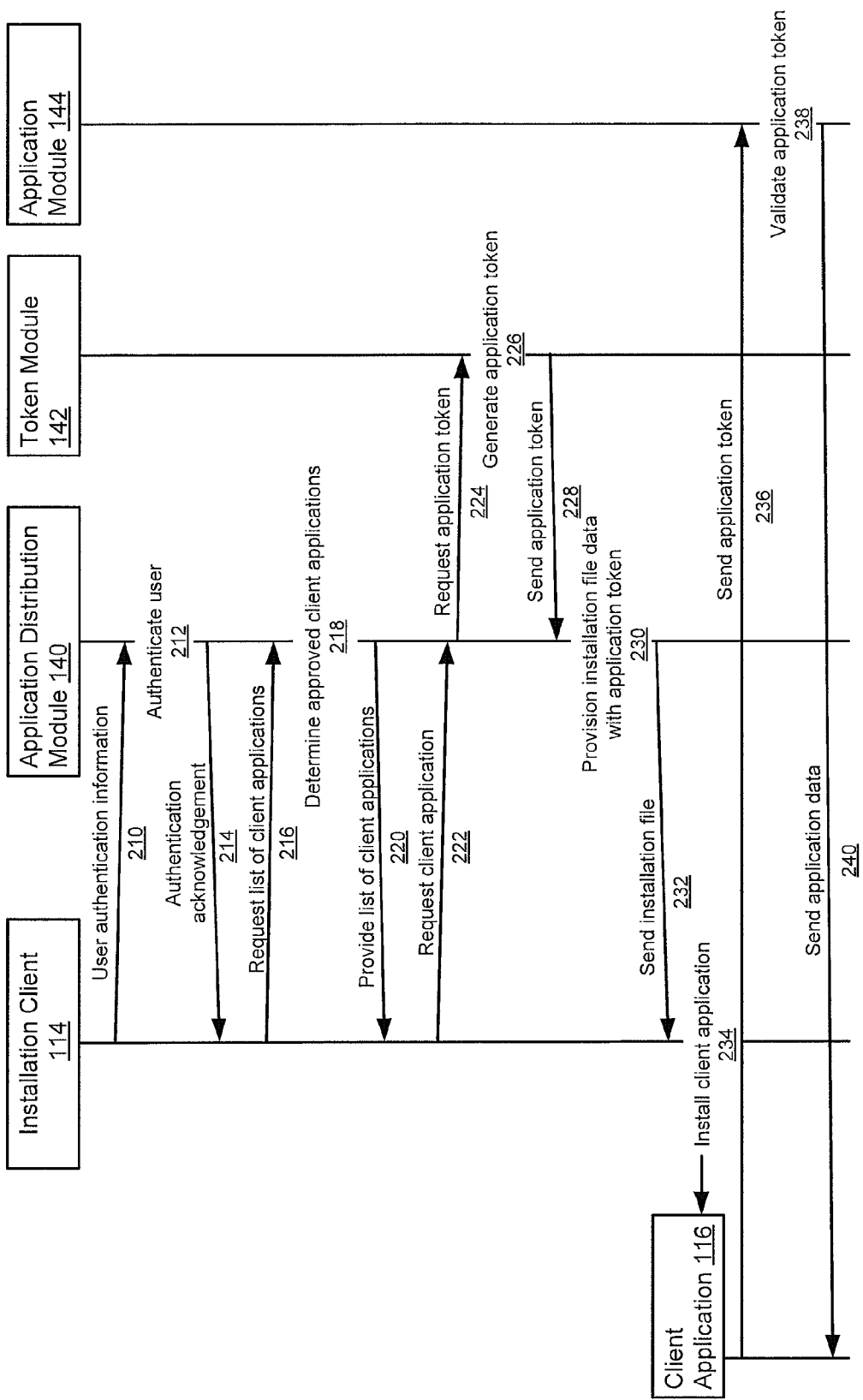
FIG. 2 is a message flow diagram illustrating a method of authenticating a user and an approved client application associated with the user on a communication device, according to an embodiment.

FIG. 2 is a message flow diagram illustrating a method of authenticating a user and an approved client application associated with the user on a communication device, according to an embodiment. FIG. 2 is discussed in reference to the application-token-provisioning-based application authorization system 100. At 210, the installation client 114 initiates the authentication of the user at the application distribution module 140 by sending user authentication information via the network 120. In some embodiments, the authentication can be initiated via the installation client 114, and in other embodiments, the authentication can be initiated via a mobile browser window operating at the communication device 110. More specifically at 210, the user authentication information can include an identifier unique to each user of the communication device 110 using the OAuth 2.0 protocol. The identifier associated with each user can be, for example, user authentication information, which can include, a user login, a user password, an employee ID number, a personal identification number (PIN), biometric information (e.g., data associated with a fingerprint scan, a retinal scan, etc.), an employee security/access level, an enterprise division code, and/or the like.

The application distribution module 140 receives the user authentication information from the installation client 114 (or a mobile browser window) via the network 120 and authenticates the user, at 212. In some embodiments, the application distribution module 140 can authenticate the user by matching the user authentication information to a specific entry in a user authentication database or a look-up table stored in the memory 132 of the enterprise server 130. The user authentication database can include, for example, a list of employees and their corresponding employment positions and security/access level, social security numbers, employee personal identification numbers (PIN), and/or the like. In other embodiments, the user authentication database can be stored in the memory of another device (e.g., server not shown) operatively coupled to the network 120. In various embodiments, the application distribution module 140 can authenticate the user using any suitable authentication protocol such as, for example, Secure Sockets Layer (SSL), Secure Shell (SSH), Kerberos, a federated protocol such as Security Assertion Markup Language (SAML), and/or the like.

In some embodiments, upon successful authentication of the user, the application distribution module 140 can generate and/or define an authentication acknowledgement signal and send the authentication acknowledgement signal via the network 120 to the installation client 114, at 214. In such embodiments, for example, the authentication acknowledgement signal can include, for example, an encrypted form of a user identity number that has been assigned to the approved user. In other embodiments, the authentication acknowledgement signal can include additional encrypted or unencrypted user credentials such as, for example, a user security/access level, user employment position, a communication device identifier, and/or the like. In yet other embodiments, the authentication acknowledgement signal can include a digital signature that can demonstrate the authenticity of the signal.

In response to receiving the authentication acknowledgement signal from the application distribution module 140, the installation client 114 can send a request for a list of client applications (the list can include an identifier associated with one or more client applications) approved by the enterprise for the user, to the application distribution module 140 via the network 120, at 216. In some embodiments, the request for the list of client applications can include an address of the application distribution module 140, an address of the enterprise server 130, a reference to a time frame for which the request will be valid, an encrypted or unencrypted form of a user identity number, user security/access level, user employment position, a communication device identifier, and/or the like.

In response to receiving the request for the list of approved client applications from the installation client 114, the application distribution module 140 can determine which client applications are approved by the enterprise for the user of the communication device 110, at 218. In some embodiments, the application distribution module 140 can use a user identity number contained in the request to query a client application database or a look-up table stored in the memory 132 of the enterprise server 130 for an entry associated with the user identity number to determine which applications are authorized for the given user of the communication device 110. In other embodiments, a user identity number may not be directly carried on the request. In such embodiments, for example, the user identity number and/or other information can be dereferenced using and/or obtained from, for example, an Open Authorization (OAuth) token included on or separate from the request. If one or multiple entries are found, the application distribution module 140 can confirm or reject the validity of such an entry and generate a list of client applications approved for the user by the enterprise. The list can include single or multiple entries depending on the user. The application distribution module 140 can also determine which applications in the client application database are not approved for the user of the communication device 110. In other embodiments, the application authorization database can be stored in the memory of another server (not shown in FIG. 1) operatively coupled to the network 120. In various embodiments, the application distribution module 140 can authenticate the list of approved client applications using any suitable authentication protocol such as, for example, Secure Sockets Layer (SSL), Secure Shell (SSH), Kerberos, and/or the like. On generating the list of approved client applications for the user of the communication device 110, the application distribution module 140 can send the list to the installation client 114 in a data package (e.g., a JavaScript Object Notation (JSON) package) via the network 120, at 220.

In some embodiments, the installation client 114 can extract a unique identifier associated with each approved client application from the list received from the application distribution module 140. The installation client 114 can send a request for the client application to the application distribution module 140 via the network 120, at 222. The client application request can include the unique identifier associated with the requested client application, an encrypted form of a user identity number that has been assigned to the authorized user, additional encrypted or unencrypted user credentials such as a user security/access level, and/or the like.

Upon receiving the request for client application 116 from the installation client 114, the application distribution module 140 can send a request for an application token associated with the client application 116 to the token module 142 via the processor bus, at 224. The token module 142 can generate and/or define an application token for the requested client application 116 installed on the communication device 110, at 226. The application token can be, for example, an OAuth access token, an OAuth refresh token, a SAML token, a SecurID token, and/or the like. In some embodiments, the application token can include an encrypted or unencrypted form of a user personal identity number (PIN), a user security/access level, a communication device 110 identification number, an installation client 114 address, an application identity number assigned to the requested application, an associated application module 144 or 156 address, and/or the like. In other embodiments, the application token can include additional encrypted or unencrypted client application credentials such as the specific features and/or resources of the client application that has been approved for the user, a duration for which the client application token is valid, and/or the like. Upon generating the application token, the token module 142 can send the application token to the application distribution module 140 via the processor bus, at 228.

The application distribution module 140 can define and/or generate installation file data associated with each requested client application 116 for the user of the communication device 110. In some embodiments, the installation file data associated with the client applications 116 can be stored in a portion of the memory 132 associated with the application distribution module 140 in the enterprise server 130. In such embodiments, the application distribution module 140 can access the installation file data associated with each requested client application 116 for the user of the communication device 110, via the system bus. In other embodiments, the installation file data associated with the client application 116 can be stored on a device separate from the enterprise server 130 in the application-token-provisioning-based application authorization system 100, and operatively coupled to the network 120. In such embodiments, the application distribution module 140 can authorize the installation file data associated with the client application 116 to be transferred to the application distribution module 140 from the location of storage, via the network 120. In some embodiments, the installation file data can include an encrypted or unencrypted form of a user personal identity number (PIN), a user security/access level, a communication device 110 identification number, an installation client 114 address, an application identity number assigned to the requested application, and/or the like. In other embodiments, the installation file data can include additional encrypted or unencrypted client application credentials such as the release date of the client application, the specific features and/or resources of the client application that have been approved for the user, and/or the like. At 230, the application distribution module 140 can provision the installation file data associated with the client application 116 to include the application token received from the token module 142. In some embodiments, the application distribution module 140 can provision the application token by directly inserting the application token into the binary form of the installation file data. In other embodiments, the application distribution module 140 can provision the application token by concatenating the application token with the installation file data. Upon provisioning the installation file data with the application token, the application distribution module can send the installation file (that is now provisioned with the application token) to the installation client 114 on the communication device 110 via the network, at 232.

Upon receiving the installation file provisioned with the application token, the installation client 114 can install the client application 116 on the communication device 110, at 234. In some embodiments, the installation client 114 can extract the application token from the installation file, and can also extract the address of the associated application module 144 from the application token. In some embodiments, the application module 144 can be located on the enterprise server 130 and the client application 116 can send the application token to the application module 144 via the network 120, at 236. In other embodiments, the application module 156 can be located on a third party application server 150, and the client application 116 can send the application token to the application module 156 via the network 120, at 236. In some embodiments, the application token can be sent to the application module 144 or 156 as part of a request for obtaining application data. In such embodiments, for example, the application token can be sent to the application module 144 or 156 as part of a representation state transfer (REST) call.

At 238, the application module 144 or 156 can receive via the network 120, the application token from the client application 116, and can assess the validity of and/or verify the attributes of the application token. In some embodiments, the application module 144 or 156 can directly validate the application token by, for instance, checking and/or verifying a digital signature. In other embodiments, the application module 144 can perform this verification by querying a database or a look-up table stored in the memory 132 of the enterprise server 130 for an entry that corresponds to the application token. In yet other embodiments, the database or look-up table can be stored in the memory of a different server operatively coupled to the network 120. For example, the application module 144 can acknowledge if an application token for a client application 116 for an authorized user of the communication device 110 has been received. In another example, the application module 144 can acknowledge if the approved functionalities of the client application 116 has been activated for the user. In yet another example, the application module 144 can acknowledge if the time stamp on the application token is valid, and/or the like.

Upon successfully validating the application token, the application module 144 can, at 240, send application data via the network 120 to the client application 116 for use during execution of the client application 116 on the communication device 110. For example, if the client application 116 is a sales application, the application data can include a representation of the price of a unit of a product, the number of units sold in a month, the number of units required in pending orders, the revenue generated from all sales in a month, the profits earned in a month, and/or the like. In some embodiments, the client application 116 can use the application data to populate a table for display to the user. In another example, if the client application 116 is a human resource (HR) application, the application data can include a user employee number, a user social security number, an employee status code, an enterprise code for paid time off (PTO), and/or the like. In some embodiments, the client application 116 can allow the user to use this data to calculate the total number of hours worked that can be charged to the enterprise in a pay cycle, and/or the like.

It should be noted that the embodiment of the application-token-provisioning-based application authorization system as described in FIGS. 1 and 2 involves the application distribution module 140 provisioning the installation file data associated with a client application 116 to include the application token associated with a requested client application 116. This can allow the client applications to be downloaded and installed on the communication device 110, and will not require any further authorization requests by the client application to other devices when it is launched by the user of the communication device 110. By provisioning the application token into the installation file data before the installation file is downloaded onto the communication device 110, the challenges involving each downloaded client application 116 having to be separately authorized (by the enterprise server 130) after download can be overcome. This provisioning of the installation file data by the application token can reduce the use of bandwidth and processor time, and can improve the usability burden for the user of the communication device 110.

In some embodiments, one or more of the steps shown in FIG. 2 can be optional to implement the application-token-provisioning-based application authorization system 100. For example, in other embodiments, the application distribution module 140 can be configured to automatically generate the list of approved client applications for the user of the communication device 110, call upon the stored installation file data associated with an approved client application, and request and receive the associated application token from the token module 142 immediately after sending the user authentication acknowledgement signal, at 214. In this embodiment, the application distribution module 140 can provision the installation file data with the application token and can send the installation file to the installation client 114 in a second data package or data stream immediately after sending the user authentication acknowledgement signal, at 214. This embodiment can prevent delays associated with waiting to receive from the installation client 114 a request for a list of client applications at 216, and a separate request for a client application at 222.

FIG. 3 is a flow chart illustrating a method of provisioning the installation file data associated with a client application on a communication device to include the application token, according to an embodiment. The method 300 includes receiving a request for a client application from a communication device, at 302. This can be performed, for example, by an application distribution module on an enterprise server. As discussed above, the enterprise server can be, for example, a web server, an application server, a proxy server, a telnet server, a file transfer protocol (FTP) server, a mail server, a list server, a collaboration server and/or the like. Also as discussed above, the application distribution module can be a hardware and/or software module stored in the memory and/or executed in a processor of an enterprise server.

In response to the request for a client application, a request for an application token associated with the requested client application can be sent, for example, from the application distribution module to a token module, at 304. The application token for a particular client application is uniquely associated with the requested client application from a set of approved client applications that can be installed on the communication device of an authorized user.

The requested application token can be received, for example, from the token module to the application distribution module in response to the request for an application token, at 306. As discussed above, in some embodiments, the application token can include a user personal identity number (PIN), user security/access level, the specific features and resources of the application that have been approved for the user, an address of the associated application module, an indication of the duration for which the application token is valid, and other information that can allow the client application to execute effectively on the communication device.

In some embodiments, the installation file data associated with a client application can be defined and/or generated in response to the request for a client application at, for example, the application distribution module. In such embodiments, the installation file data can be stored in the memory of the enterprise server associated with the application distribution module. In other embodiments, the installation file data associated with each approved client application can be defined and/or generated at the application distribution module prior to receiving a request for a client application. In such embodiments, the installation file data can be stored in the memory of the enterprise server associated with the application distribution module or on a device separate from the enterprise server, and operatively coupled to the network.

At 308, the installation file data can be provisioned to include the application token associated with the requested client application at, for example, the application distribution module. As discussed above, in some embodiments, the installation file data can include an encrypted or unencrypted form of a user personal identity number (PIN), a user security/access level, the version of the client application, the specific features and/or resources of the client application that have been approved for the user, a communication device identification number, an installation client address, an application identity number assigned to the requested application, and/or the like. Also as discussed above, in some embodiments, the installation file data can be provisioned to include the application token by direct insertion of the application token in the binary form of the installation file data at, for example, the application distribution module. In other embodiments, the installation file data can be provisioned to include the application token by concatenation of the application token to the installation file data at, for example, the application distribution module.

The installation file that has been provisioned with the application token can be sent to the communication device by, for example, the application distribution module, at 310. The communication device can install the client application using the installation file. The installation client can extract the application token from the installation file and the address of the application module associated with the client application from the application token. Also at 310, the client application can authenticate to the associated application module by sending the application token to the application module using the extracted address. As discussed above, for example, authentication can involve ascertaining if an application token for an approved client application for the user was sent from the client application to the application module. In another example, authentication can involve ascertaining if the approved functionalities of the client application specific for the user have been activated. In yet another example, authentication can involve ascertaining if the time stamp on the application token is valid.

FIG. 4 is a flow chart illustrating a method of receiving an individual installation file for a client application approved for a user of a communication device, according to an embodiment. The method 400 includes sending, for example, from an installation client on a communication device, a request for a client application to an application distribution module on an enterprise server, at 402. As discussed above, in some embodiments, the communication device can be a personal computing device such as a desktop computer, a laptop computer, a personal digital assistant (PDA), a standard mobile telephone, a tablet personal computer (PC), and/or so forth. Also as discussed above, in some embodiments, an installation client can be a native application installed on the communication device. The installation client can be a hardware and/or software module stored in the memory and/or executed in the processor of the communication device.

In response to the request for a client application, the installation client can receive from, for example, the application distribution module an installation file associated with the client application that includes an application token associated with the requested client application, at 404. As discussed above, in some embodiments, the application token can include a user personal identity number (PIN), user security/access level, an indication of the duration for which the application token is valid, an address of the associated application module, and other information that can allow the application to execute effectively on the communication device.

The installation client can install, for example, on the communication device, the client application using the installation file, at 406. As discussed above, in some embodiments, the installation file can include a user personal identity number (PIN), a user security/access level, the version of the client application to be installed, the specific features and/or resources of the client application that have been approved for the user, a communication device identification number, an installation client address, an application identity number assigned to the requested application, and/or the like.

The installation client can extract data such as, for example, the application token from the installation file, and the address of the application module associated with the client application from the application token, at 408. Also at 408, the client application can be configured to authenticate, for example, to an associated application module remote from the communication device, by sending the application token to the application module using the extracted address. As discussed above, for example, authentication can involve ascertaining if an application token for an approved client application for the user was sent from the client application to the application module. In another example, authentication can involve ascertaining if the approved functionalities of the client application specific for the user have been activated. In yet another example, authentication can involve ascertaining if the time stamp on the application token is valid.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A non-transitory processor-readable medium storing code representing instructions to be executed by a processor, the code comprising code to cause the processor to:

receive, from a communication device, a request for a client application;

provision, upon the receiving the request, an installation file associated with the client application to include an application token associated with the client application; and send the installation file to the communication device such that the communication device installs, using the installation file, the requested client application that subsequently authenticates to an application module, at a server, using the application token extracted from the installation file to obtain application data from the server.

2. The non-transitory processor-readable medium of claim 1, wherein the installation file is a native application binary installation file associated with the client application.

3. The non-transitory processor-readable medium of claim 1, further comprising code to cause the processor to:

receive, from the communication device, a login request associated with a user of the communication device; and authenticate the communication device based on the login request, the application token being associated with the client application and the communication device.

4. The non-transitory processor-readable medium of claim 1, wherein the application module is within a Software as a Service (SaaS) host.

5. The non-transitory processor-readable medium of claim 1, wherein the application module is within an enterprise host.

6. The non-transitory processor-readable medium of claim 1, wherein the application token is at least one of an OAuth access token or an OAuth refresh token.

7. The non-transitory processor-readable medium of claim 1, further comprising code to cause the processor to:

receive, from the communication device, a user token and a request for a set of client application identifiers;

define, based on the user token, the set of client application identifiers; and send, to the communication device, the set of client application identifiers, an identifier associated with the client application being within the set of client application identifiers.

8. The non-transitory processor-readable medium of claim 1, wherein the request for the client application includes a user token associated with a user of the communication device, the code further comprising code to cause the processor to:

determine, based on the user token and prior to the provisioning the installation file and the sending the installation file, that the user of the communication device is authorized to receive the client application.

9. The non-transitory processor-readable medium of claim 1, further comprising code to cause the processor to:

send, to a token module, a request for the application token associated with the client application in response to receiving the request for the client application; and receive the application token in response to the request for the application token.

10. An apparatus, comprising:

an application distribution module configured to send, to a token module at a first server, a request for a token upon receiving, from a communication device, a request for a client application, the token being associated with (1)

authentication information of a user of the communication device and (2) the requested application, the application distribution module at the first server configured to receive the token from the token module in response to the request for the token, and subsequently the application distribution module configured to provision an installation file associated with the requested client application to include the application token, the application distribution module configured to send the installation file to the communication device such that the communication device installs, using the installation file, the requested client application that subsequently authenticates to an application module, at a second server, using the application token extracted from the installation file to obtain application data from the second server.

11. The apparatus of claim 10, wherein the application distribution module is configured to receive, from the communication device, (1) a request for the client application and (2) the authentication information associated with the user of the communication device, the application distribution module configured to send the request for the token in response to the request for the client application.

12. The apparatus of claim 10, wherein the application token is at least one of an OAuth access token or an OAuth refresh token.

13. The apparatus of claim 10, wherein the installation file is a native application binary installation file associated with the client application.

14. The apparatus of claim 10, wherein the application distribution module is configured to receive the authentication information from the communication device at a first time, the application distribution module being configured to receive a request for the client application from the communication device at a second time after the first time.

15. The apparatus of claim 10, wherein the application distribution module is configured to receive, from the communication device, the authentication information, the application distribution module configured to determine a role of the user of the communication device based on the authentication information, the application distribution module configured to send, to the communication device, a set of client application identifiers associated with the role, the set of client application identifiers including an identifier associated with the client application.

16. A non-transitory processor-readable medium storing code representing instructions to be executed by a processor, the code comprising code to cause the processor to:

send, to an application distribution module at a first server, a request from a communication device for a client application;

receive, from the application distribution module at the first server and in response to the request for the client application, an installation file associated with the client application and including an application token associated with the requested client application;

install, at the communication device, the requested client application using the installation file; and subsequently extract the application token by the requested client application from the installation file such that the requested client application is configured to be authenticated at an application module at a second server remote from the communication device using the application token to obtain application data from the second server.

17. The non-transitory processor-readable medium of claim 16, wherein the installation file is a native application binary installation file associated with the client application.

18. The non-transitory processor-readable medium of claim 16, further comprising code to cause the processor to:

send, to the application distribution module, a login request associated with a user such that the application distribution module authenticates the user based on the login request, the application token being associated with the user based on the application distribution module authenticating the user.

19. The non-transitory processor-readable medium of claim 16, wherein the application token is at least one of an OAuth access token or an OAuth refresh token.

20. The non-transitory processor-readable medium of claim 16, wherein the application module is at a Software as a Service (SaaS) host.

21. The non-transitory processor-readable medium of claim 16, wherein the application module is at an enterprise host.

* * * * *

UNITED STATES PATENT AND TRADEMARK OFFICE
CERTIFICATE OF CORRECTION

PATENT NO. : 8,473,749 B1
APPLICATION NO. : 13/544553
DATED : June 25, 2013
INVENTOR(S) : Paul Madsen et al.

Page 1 of 1

It is certified that error appears in the above-identified patent and that said Letters Patent is hereby corrected as shown below:

In the Claims

Claim 10, column 15, line 2, change:

"tion device and (2) the requested application, the appli-"

to

--tion device and (2) the requested client application, the appli- --

Signed and Sealed this
Twenty-ninth Day of October, 2013

Teresa Stanek Rea
*Deputy Director of the United States Patent and Trademark Office*